United States Patent [19]
Knox

[11] 3,921,885
[45] Nov. 25, 1975

[54] METHOD OF BONDING TWO BODIES TOGETHER

[75] Inventor: Joseph Dale Knox, Princeton, N.J.

[73] Assignee: RCA Corporation, New York, N.Y.

[22] Filed: June 28, 1973

[21] Appl. No.: 374,396

[52] U.S. Cl. .................. 228/116; 228/121; 228/208
[51] Int. Cl.² .......................................... B23K 21/00
[58] Field of Search ............ 29/472.7, 472.9, 473.1, 29/594, 470.1, 488, 498, 501, 502, 504; 228/115, 116, 121, 208

[56] References Cited
UNITED STATES PATENTS

| | | | |
|---|---|---|---|
| 3,131,459 | 5/1964 | Allen | 29/472.7 |
| 3,252,722 | 5/1966 | Allen | 29/504 X |
| 3,590,467 | 7/1971 | Chase et al. | 29/472.7 |
| 3,599,123 | 8/1971 | Krause | 29/473.1 X |
| 3,791,028 | 2/1974 | Missel | 29/470.1 X |
| 3,798,746 | 3/1974 | Alphouse et al. | 29/470.1 |

OTHER PUBLICATIONS

J. J. Cuomo, I.B.M. Technical Disclosure Bulletin, Vol. 7, No. 3 Aug. 1964.

American Welding Society, *Welding Handbook*, Section 3, Fifth Edition, Chapter 50, pages 50.2–50.4, 1966.

American Welding Society, Welding Handbook, Section 4, Fifth Edition, Chapter 74, pages 74.10–74.11, 1966.

Sittig et al., Proceedings IEEE, A Method for Preparing and Bonding Ultrasonic Transducers Used in High Frequency Digital Delay Lines, 1968, pages 1375–1376.

*Primary Examiner*—Granville Y. Custer, Jr.
*Assistant Examiner*—James W. Davie
*Attorney, Agent, or Firm*—G. H. Bruestle; D. S. Cohen

[57] ABSTRACT

A surface of each of the bodies is coated with a layer of gold. The bodies are placed in a chamber which is evacuated to a pressure of at least $10^{-3}$ torr. While maintaining the chamber and its contents at room temperature, the gold layers are brought into contacting relation and a pressure of between 800 psi and 2500 psi is applied to the bodies to bond the gold layers together.

3 Claims, 3 Drawing Figures

METHOD OF BONDING TWO BODIES TOGETHER

BACKGROUND OF THE INVENTION

The present invention relates to a room temperature, relatively low pressure bonding method for bonding together two bodies. More particularly, the present invention relates to such a bonding method for bonding together two crystal bodies of an acoustic transducer device to provide a bond between the bodies which is mechanically strong and which will satisfactorily transmit high frequency oscillations.

Acoustic devices, such as light deflectors, modulators and acoustic delay lines, generally include a transducer body which is capable of generating high frequency oscillations, bonded to a body of a material which utilizes the oscillations for the purpose of the particular device. Such bodies are generally of crystalline piezoelectric materials. For such acoustic devices, the bond between the bodies must not only provide a good mechanical connection between the bodies but must also be capable of transmitting the high frequency oscillations with a minimum of loss.

The normal techniques of bonding two bodies together by means of a solder or brazing material are not satisfactory for the acoustic devices because the solders or brazing materials are too lossy with regard to the transmission of high frequency oscillations. Another method which has been used to bond two bodies together is to coat a surface of each of the bodies with a metal film and fuse the two metal films together by the application of heat and pressure. However, this method is not satisfactory for acoustic devices since the temperature to which the bodies are heated during the fusion operation can adversely affect the bodies. Another method which has been used and which can be carried out at room temperature is to coat a surface of each of the bodies with a film of a soft metal, such as indium, and then fuse the soft metal films together by the application of pressure. However, this method also is not suitable for high frequency acoustic devices (i.e. microwave delay lines) since the soft metal which has been used is lossy with regard to the transmission of high frequency oscillations. Therefore, to bond together the bodies of two acoustic devices, it is desirable to have a bonding method which can be carried out under conditions which do not adversely affect the bodies, i.e. at room temperature and relatively low pressure, and which provides a bond having good mechanical properties as well as good high frequency oscillation transmission properties.

SUMMARY OF THE INVENTION

Two bodies are bonded together by coating a surface of each of the bodies with a layer of gold. The bodies are placed in a chamber which is evacuated. The gold layers are brought into contacting relation and a pressure is applied to the bodies sufficient to bond the gold layers together.

DETAILED DESCRIPTION

Figure 2:
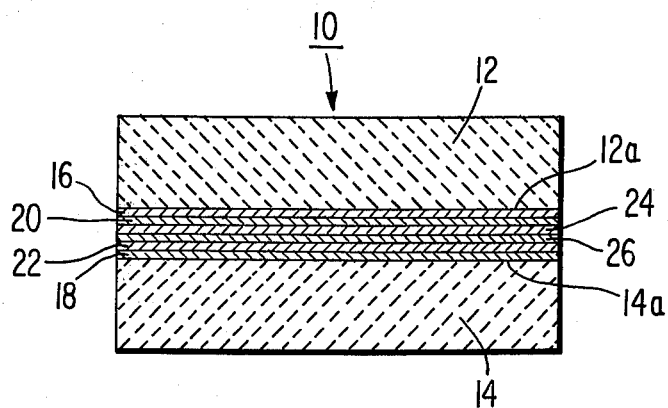
FIG. 2 is a cross-sectional view of a device made by the method of the present invention.

Referring initially to FIG. 2, a form of an acoustic device made by the method of the present invention is generally designated as 10. The acoustic device 10 comprises a pair of bodies 12 and 14, of a piezoelectric material, such as lithium niobate, or other acoustic materials, such as spinel, paratellurite or high index glasses. The bodies 12 and 14 each has a surface 12a and 14a, respectively, which is optically polished to a smooth, flat condition. Coated on each of the surfaces 12a and 14a is a layer 16 and 18, respectively, of a metal which adheres well to the material of the body, such as chromium, molybdenum or titanium. On each of the metal layers 16 and 18 is a thin layer 20 and 22, respectively, of aluminum. The aluminum layers 20 and 22 are preferably of a thickness of 1500 to 2500A. Coated on each of the aluminum layers 20 and 22 is a thin layer 24 and 26, respectively, of gold. The gold layers 24 and 26 are preferably of a thickness of 500 to 1000A. The gold layers 24 and 26 are in contacting relation and are fused together by the method of the present invention.

Figure 1:
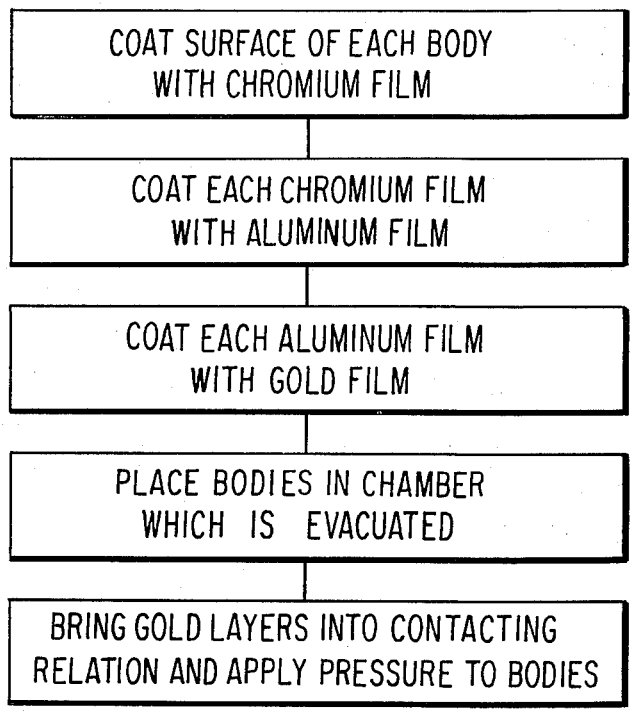
FIG. 1 is a flow chart showing the steps of the method of the present invention.

As indicated in the flow chart of FIG. 1, to make the acoustic device 10 by the method of the present invention, the surfaces 12a and 14a of the bodies 12 and 14 are each first coated with the metal layer 16 and 18, respectively, such as by the well-known technique of evaporation in a vacuum. The aluminum layers 20 and 22 are then coated on the metal layers 16 and 18, respectively, and the gold layers 24 and 26 are then coated on the aluminum layers 20 and 22, respectively. The aluminum layers 20 and 22 may be applied by the well-known technique of evaporation in a vacuum, and the gold layers 24 and 26 may be applied either by evaporation in a vacuum or by electroplating.

Figure 3:
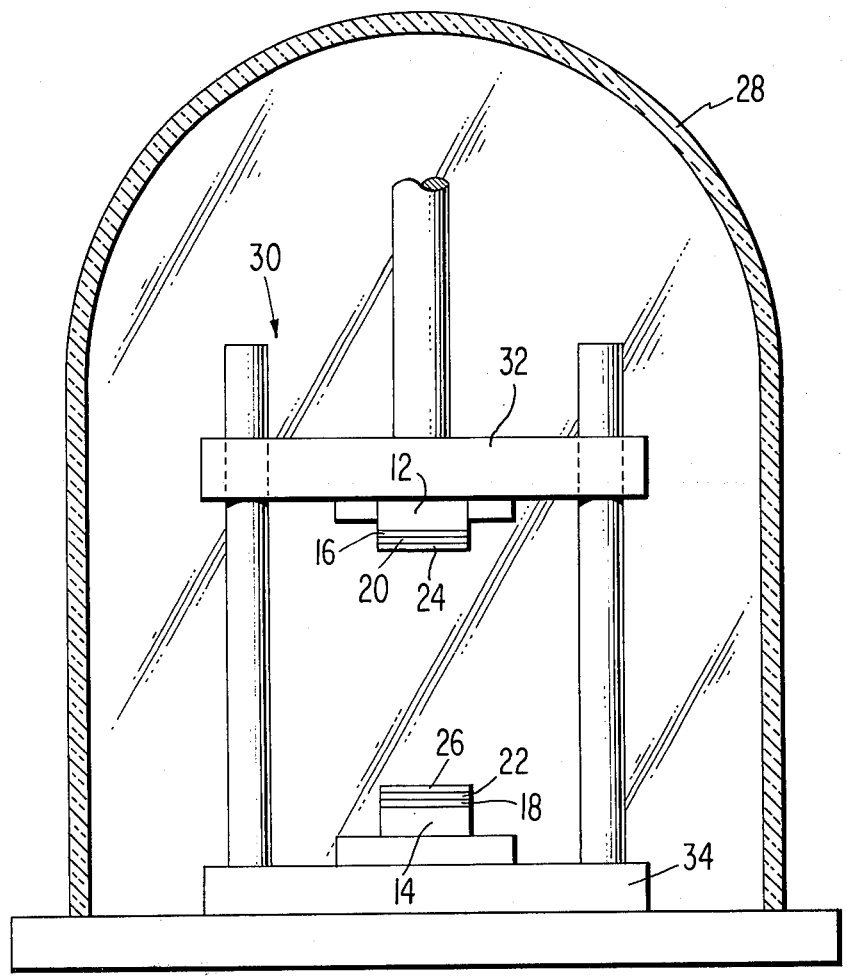
FIG. 3 is a schematic view of an apparatus suitable for carrying out the method of the present invention.

As shown in FIG. 3, the two bodies 12 and 14 are then placed in a chamber 28 which contains a press 30. The bodies 12 and 14 are mounted on the plates 32 and 34 respectively, of the press 30 with the gold layers 24 and 26 facing each other. The chamber 28 is then evacuated to a pressure of at least $10^{-3}$ torr and preferably to a pressure of $10^{-6}$ torr. The plate 32 of the press 30 is then moved toward the plate 30, either by hydraulic or mechanical means, until the gold layers 24 and 26 are contacting each other. While maintaining the chamber and its contents at room temperature, a pressure of 800 to 1600 psi is applied to the bodies and maintained for a time to cause the gold layers 24 and 26 to bond together. When a pressure of 1200 psi is applied to the bodies, fusion of the gold layers 24 and 26 is achieved when the pressure is maintained for about 1 hour. If a lower pressure is used, the time necessary to achieve bonding of the gold layers will be higher, whereas the time is lower if a higher pressure is used.

In the method of the present invention, by bonding the two bodies 12 and 14 together in an evacuated chamber, the gold layers 24 and 26 can be fused together at room temperature and at a relatively low pressure so that the bodies will not be broken or otherwise adversely affected. The metal layers 16 and 18 merely serve as adhesive layers to achieve good adhesion of the aluminum layers 20 and 22 to the bodies 12 and 14. The aluminum layers 20 and 22 serve to provide good alignment between the surfaces 12a and 14a of the bodies 12 and 14 when the bodies are pressed together. However, if desired, the aluminum layers 20 and 22 can be eliminated and replaced with thicker gold layers 24 and 26. If thicker gold layers are used, the presssure necessary to achieve bonding of the gold layers should be increased to between about 2000 and 2500 psi.

The method of the present invention not only provides a good mechanical bond between the bodies 12 and 14, which bond is achieved at room temperature and relatively low pressure, but the gold to gold bond also provides for good transmission of high frequency oscillations from one of the bodies to the other. Although the method of the present invention has been described for bonding together two bodies of an acoustic device, it can also be used to bond together any two bodies which may be adversely affected by high temperatures and pressures.

I claim:

1. A method of bonding together two bodies of an acoustic material comprising the steps of
    applying a layer of gold on a surface of each of the bodies,
    placing the bodies in a chamber,
    evacuating said chamber to a pressure of at least $10^{-3}$ torr,
    bringing the gold layers into contacting relation, and
    with the bodies being at room temperature applying a pressure of 800 to 1600 psi to said bodies for a time sufficient to bond the gold layers together.

2. A method in accordance with claim 1 including providing a layer of aluminum over each of said surfaces of the bodies and coating the gold layer on the aluminum layer.

3. The method in accordance with claim 2 including coating each of said surfaces of the bodies with a metal adhesive layer selected from the group consisting of chromium, molybdenum and titanium and coating the aluminum layers on the adhesive layers.

* * * * *